(12) United States Patent
Schäferling

(10) Patent No.: US 8,978,531 B2
(45) Date of Patent: Mar. 17, 2015

(54) SEPARATING DEVICE FOR AN ASSEMBLY LINE TYPE PRODUCTION LINE

(75) Inventor: Rudolf Schäferling, Bissingen (DE)

(73) Assignee: Grenzebach Maschinenbau GmbH, Asbach-Baumenheim (DE)

( * ) Notice: Subject to any disclaimer, the term of this patent is extended or adjusted under 35 U.S.C. 154(b) by 1082 days.

(21) Appl. No.: 12/665,267

(22) PCT Filed: Jun. 16, 2008

(86) PCT No.: PCT/DE2008/000989
§ 371 (c)(1),
(2), (4) Date: Dec. 17, 2009

(87) PCT Pub. No.: WO2008/154902

PCT Pub. Date: Dec. 24, 2008

(65) Prior Publication Data

US 2010/0186562 A1    Jul. 29, 2010

(30) Foreign Application Priority Data

Jun. 20, 2007    (DE) .................. 10 2007 028 417

(51) Int. Cl.
*B26D 1/56*    (2006.01)
*B26D 7/06*    (2006.01)
(Continued)

(52) U.S. Cl.
CPC ............ *B23D 45/105* (2013.01); *B23D 45/046* (2013.01); *B23D 47/042* (2013.01); *B23D 47/06* (2013.01)
USPC ................... 83/303; 83/316; 83/318; 83/424; 83/428; 83/490

(58) Field of Classification Search
CPC .......... B23D 45/06; B23D 45/18; B26D 1/16; B26D 1/165; B26D 1/18; B26D 1/185; B26D 1/24; B26D 1/56
USPC ........ 83/271, 424, 428, 435, 469, 490, 471.2, 83/614
See application file for complete search history.

(56) References Cited

U.S. PATENT DOCUMENTS 2,682,307 A  *  6/1954 Overman ................... 83/318
3,350,970 A  *  11/1967 Glastra ..................... 83/424
(Continued)

FOREIGN PATENT DOCUMENTS

AT    104894    12/1926
CH    93038    2/1922
(Continued)

OTHER PUBLICATIONS

Japanese Patent Office, Notification of Reason for Refusal, mailed Jan. 24, 2012; pp. 1-7.

*Primary Examiner* — Kenneth E. Peterson
*Assistant Examiner* — Samuel A Davies
(74) *Attorney, Agent, or Firm* — Duane Morris LLP; J. Rodman Steele, Jr.; Karen C. Kline

(57) ABSTRACT

The invention relates to a device for separating insulating materials which were obtained in a continuous production process and are made of mineral wool in determinable lengths, comprising the following features: a) the separation of the material is carried out by means of two separately driven circular saw blades (6) which are suspended like a pendulum; b) the position of the suspension (1) and the drive (2) of the saw blades (6) can be adjusted by means of a carriage (4) in the direction of supply of the material; c) the drive of the carriage (3), the drive of the saw blades (2), the drive of the pendular units (14) and the driving action of the conveyor belt (15) are provided by servomotors; d) a deflection unit (12) causes the lowering of the conveyor belt (15) in the respective area of the saw blades (6); e) the process of material separation is automatically controlled in accordance with the cutting performance of the separating means and the advancement speed of the material supply. The invention also relates to an associated method and a machine-readable support provided with the program code.

6 Claims, 4 Drawing Sheets

(51) Int. Cl.
  *B26D 1/18* (2006.01)
  *B23D 7/06* (2006.01)
  *B23D 7/04* (2006.01)
  *B23D 45/10* (2006.01)
  *B23D 45/04* (2006.01)
  *B23D 47/04* (2006.01)
  *B23D 47/06* (2006.01)

(56) References Cited

U.S. PATENT DOCUMENTS

| | | | | |
|---|---|---|---|---|
| 3,413,881 | A | * 12/1968 | Stolzer | 83/486 |
| 3,732,767 | A | * 5/1973 | Habert | 83/171 |
| 4,679,475 | A | * 7/1987 | Antezana | 83/420 |
| 5,430,999 | A | * 7/1995 | Grant | 56/11.9 |
| 5,442,985 | A | * 8/1995 | Ito | 83/155 |
| 2002/0157513 | A1 | * 10/2002 | Wierschke et al. | 83/174 |

FOREIGN PATENT DOCUMENTS

| | | |
|---|---|---|
| DE | 3713260 | 11/1988 |
| DE | 4018446 | 12/1990 |
| DE | 19756622 | 11/1998 |
| DE | 19846946 | 4/2000 |
| EP | 0385217 | 5/1994 |
| FR | 58807 | 4/1954 |
| GB | 2020606 | 11/1979 |
| JP | 53232794 A | 12/1984 |
| JP | 61293560 A | 12/1986 |
| JP | 1154960 A | 6/1989 |
| JP | 1146700 A | 8/1989 |
| JP | 2109700 A | 4/1990 |
| JP | 03066598 A | 3/1991 |
| JP | 03112409 A | 5/1991 |
| JP | 04078902 A | 3/1992 |
| JP | 067367 A | 1/1994 |
| JP | 0636721 A | 2/1994 |
| JP | 1190886 A | 6/1999 |
| JP | 20022321119 A | 11/2002 |
| RU | SU791472 A2 | 12/1980 |
| RU | SU1122455 A1 | 11/1984 |
| RU | 2156676 | 9/2000 |
| SU | 791472 | 12/1980 |
| SU | 1122455 | 11/1984 |

* cited by examiner

SEPARATING DEVICE FOR AN ASSEMBLY LINE TYPE PRODUCTION LINE

CROSS-REFERENCE TO RELATED APPLICATIONS

This application is a §371 national stage entry of International Application No. PCT/DE2008/000989, filed Jun. 16, 2008, which claims priority to German Patent Application No. 10 2007 028 417.0, filed Jun. 20, 2007, both of which are hereby incorporated by reference.

FIELD OF THE INVENTION

The invention relates to a method and a device for separating materials which are produced in an assembly-line-like production process and have to be separated into certain formats to obtain a desired delivery state.

BACKGROUND

Such a material is, for example, mineral wool, which has to be separated into commercially customary sheets for shipping.

Insulating materials comprising mineral wool consist of vitreously solidified mineral fibers which are joined together in principle at discrete points by small amounts of a binder, usually a thermosetting plastic. The mineral fibers are obtained from a melt which is fiberized in a fiberizing unit. It is common commercial practice to distinguish between insulating materials comprising glass wool and rock wool.

Glass wool fibers are produced from silicate melts with relatively high alkali content, optionally also boroxides, by passing the melt through the fine openings in the wall of a rotating body. This creates relatively long and smooth mineral fibers, which are provided with binders and impregnating agents and fall onto an air-permeable transporting belt.

An endless fiber web drawn off from the fiberizing units is transported away at a greater or lesser speed, depending on the desired thickness and apparent density. The curing of the binder fixing the structure of the insulating material to be produced takes place in a curing oven, in which hot air is passed through the fibrous web. Subsequently, the cured fibrous web is trimmed at the sides and, for example, divided in the middle into two webs, from which sheets of insulating material of a certain length and any desired widths, within the limits of the width of the web, can be separated with hardly any loss.

Insulating materials comprising rock fibers, in particular sheets of insulating material comprising rock fibers, are less readily compressible than insulating materials comprising glass fibers, since they have distinctly different structures, which are evident primarily in the tangled form of the short rock fibers, the rock fibers already aggregating into flocks on the way from the fiberizing machine to a transporting belt. The insulating materials produced from this have, for example, very narrow variations in apparent density over the width of the production line and the height of the fibrous web.

Sheets of insulating material comprising rock fibers are produced with customary dimensions of 1 m or 1.2 m in length along with a width of 0.6 m or 0.65 m and thicknesses of about 20 mm to about 240 mm.

Sheets of insulating material are produced in large quantities, and therefore first have to be divided into appropriate formats before they are ordered in stacks.

Austrian patent specification AT 104894 discloses a crank-driven pendulum saw for a comparable purpose, with a conveyor belt for displacing the material to be cut.

This saw has an adjustable device, with which the length to be cut off in each case can be precisely set. With this device, only low cycle times can be achieved for separating the material to be cut.

Swiss patent specification CH 93038 discloses a pendulum saw which is distinguished by the fact that the saw blade is suspended from a fixedly mounted rocker by means of a hanging link, so that it can be displaced in a horizontal path by swinging the hanging link back and forth on the rocker. Significant cycle times cannot of course be achieved with this solution either.

DE 198 46 946 A1 describes operating modes of point-contact pendulum saws, understood as meaning saws in which the sawing implement is made up of one or more parallel saw blades clamped in place. For this type of design, it is proposed in this document that the pendular mass, that is to say the saw frame with the saw blades, does not oscillate on a circular path but on a path that describes a double cycloid curve. However, this document does not make any reference to the construction of a pendulum saw with circular saw blades.

Recent development has been toward pendulum saws that are actuated by means of hydraulic devices, which are expensive, react relatively slowly and require sophisticated controlling operations. No printed citations as evidence of this are known.

SUMMARY OF THE INVENTION

The present invention therefore addresses the problem of providing a device and a method for quickly and reliably separating materials which are produced in an assembly-line-like production process.

This problem is solved by a device as claimed in claim 1 and 2, and a method as claimed in claim 6.

BRIEF DESCRIPTION OF THE DRAWINGS

The separating device according to the invention is described in more detail below.

The figures specifically show.

DETAILED DESCRIPTION

Figure 1:
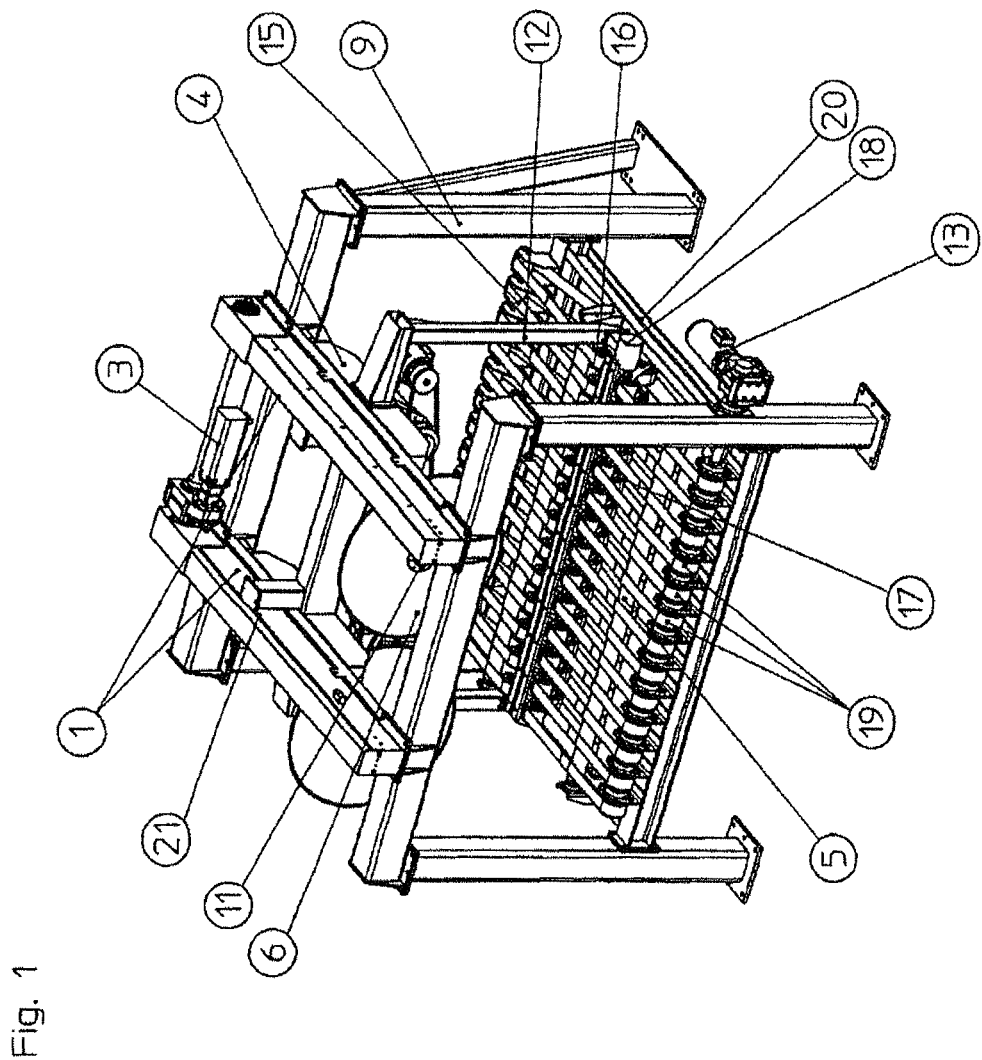
FIG. 1: the separating device in a perspective oblique view.

The separating device represented in FIG. 1 substantially comprises a basic frame (9), which has the two upper carriage supports (1) as cross members. Secured to the rear carriage support (1) is a running rail (21) for the carriage (4), which among other things carries the bearings and mountings (11) for the saw blades (6).

The carriage (4) can be moved by means of a synchronous drive (3).

The carriage (4) on the one hand runs on the running rail (21) and on the other hand is rigidly connected to the deflecting unit (12). This deflecting unit (12) has for its part a guiding carriage, which runs on the running rail (20).

In the case of a very rigid and stable configuration, it is possible to dispense with this guiding carriage of the deflecting unit (12).

The deflecting unit (12) ensures that the saw blades (6) cannot unintentionally cut up the transporting belt (15) in the region of the running plane of the latter. This is achieved by the transporting belt (15) being diverted in the region of the saw blades (6) in the form of a V-shaped or U-shaped diversion.

The diversion is displaceably configured.

Since the saw blades (6) for their part have to be displaceable over the carriage (4), the deflecting unit (12) is rigidly connected to the carriage (4) and therefore moves synchronously with the positioning of the saw blades (6).

Figure 4:
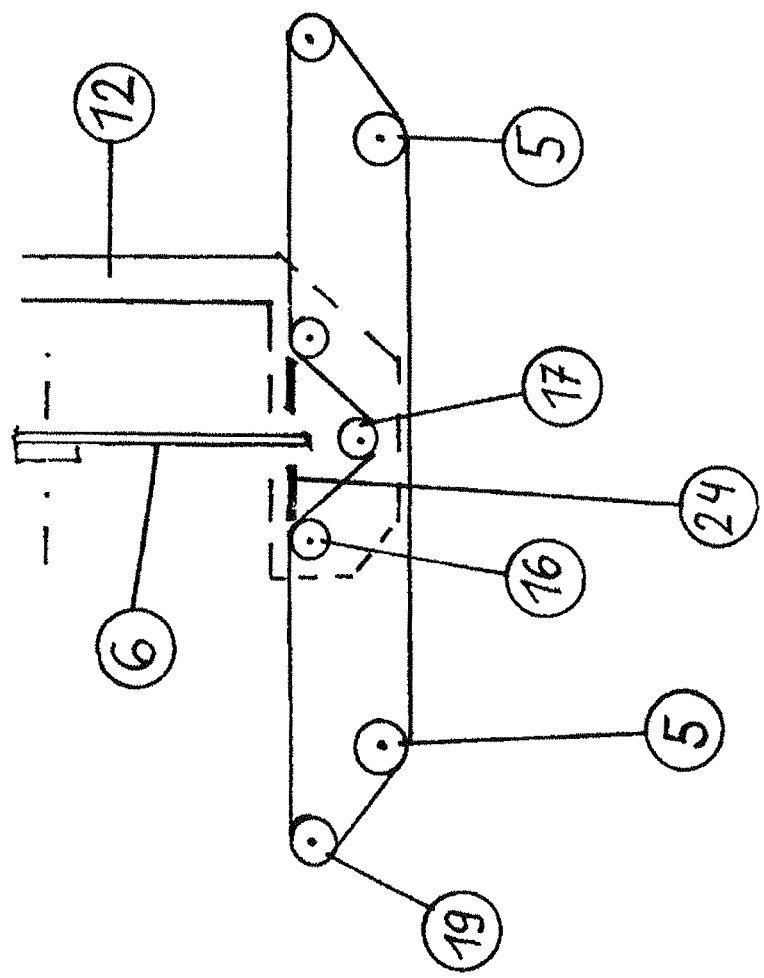
FIG. 4: a detailed representation of the deflecting unit

The upper deflecting rollers (16), associated with the deflecting unit (12), and the lower deflecting roller (17) can only be seen unclearly in FIG. 1 because of the perspective representation, and are therefore illustrated once again in FIG. 4, in an enlarged representation.

The transporting belt (15) is moved by the drive (13) by way of the drive roller (19).

In the region of the deflecting unit, the suction extraction device (18) takes care of disposal of the sawdust.

Figure 2:
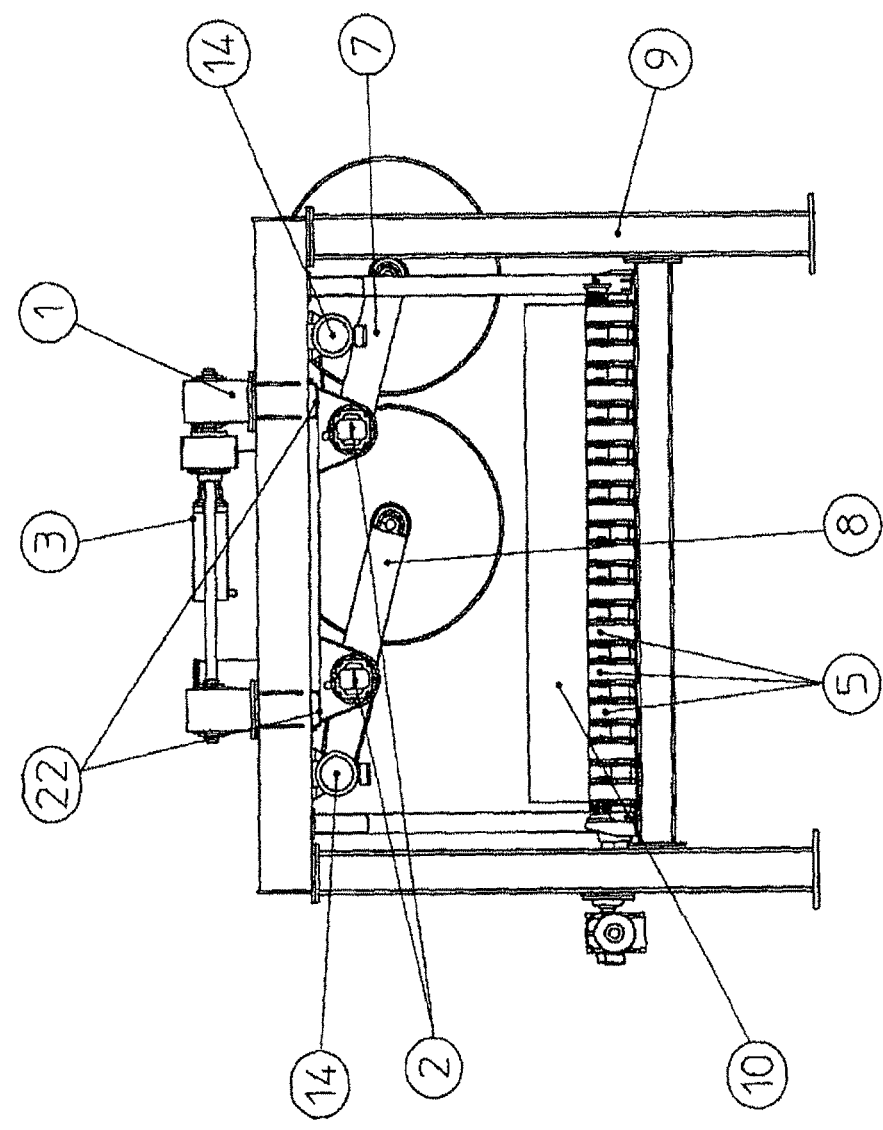
FIG. 2: the separating device in a perspective side view

Apart from the already mentioned carriage support (1), the synchronous drive (3) and the basic frame (9), also represented in the side view of FIG. 2 is a respective drive unit (2) for a saw blade (6). The respective power transmission from the drive unit (2) to the saw blades (6) takes place here by way of a power transmission element (8). Such an element (8) may comprise a toothed belt, a chain or a cardan drive. The additional pendular movement of the saw blades (6) is accomplished by way of the respective pendulum element (14).

The saw blades (6) may run in the same rotational sense or else be operated in opposite directions. The meshing should be noted in this respect.

The complete drive is accommodated in a protected manner in a pendulum housing (7).

On the transporting belt (15) there is sketched in this representation a material (10) to be separated that is rectangular in cross section.

The functional unit (22) refers to sensors of the widest variety of types and ranges of detection. Depending on which materials are to be worked by the separating device according to the invention, different parameters should be detected to ensure the operational reliability of the system as a whole. For example, apart from detecting the rotational speed of each saw blade (6), the drop in speed when the blade plunges into the workpiece and the temperature in the separating region, the widest variety of parameters indicating inadmissible vibrations should be detected. Precisely in this area, different characteristic values should be noted for each material.

When separating rock-like material, the maintenance of a path describing a double cycloid curve during the operation of the saw blades (6) is preferred. This is primarily achieved by the pendular path not being circular. More details of this can be found in DE 198 46 946 A1, for which there is no protective right and which is therefore free prior art. Such a path curve has been found to be advantageous also when separating other materials.

Figure 3:
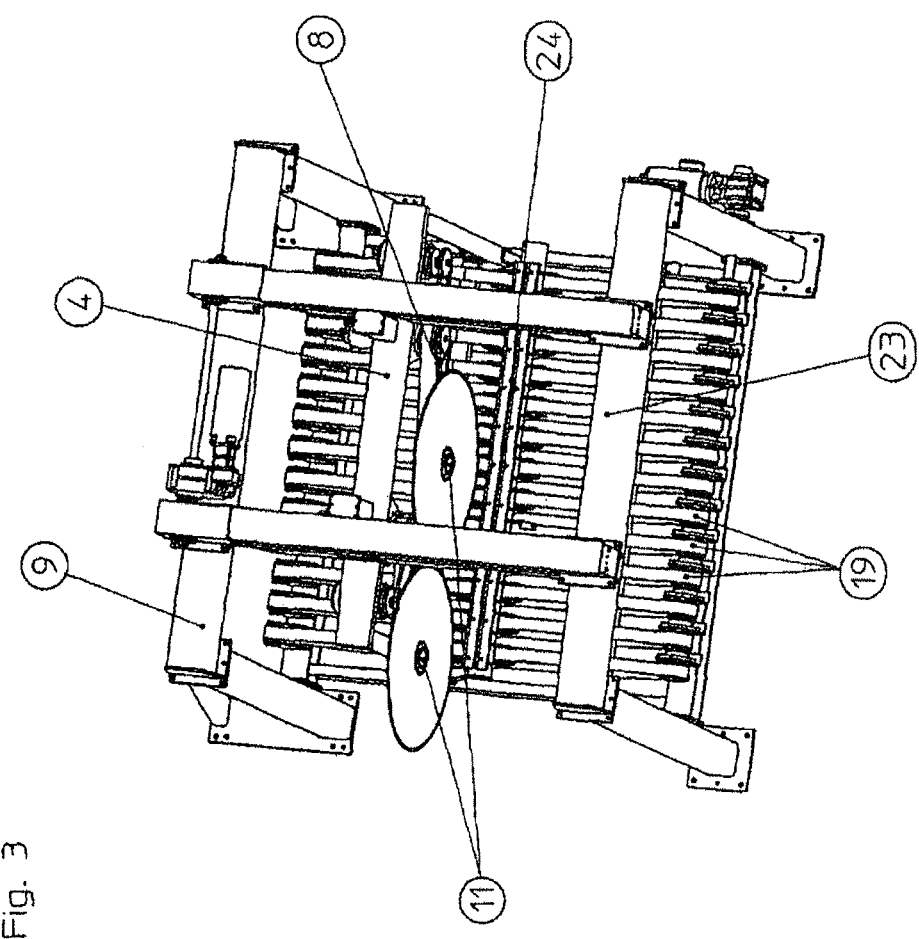
FIG. 3: the separating device obliquely from above

In the representation of the separating device according to the invention obliquely from above of FIG. 3, the exact position of the covering of the saw gap (24) can additionally be seen.

Furthermore, the exposed position of the camera system (23) with respect to the device as a whole can also be made out in this figure. The term camera system covers different variants here in terms of equipment, depending on the degree of monitoring required and the configuration level of the automatic sequence. For instance, apart from taking stereo images, photos taken in special optical frequency ranges, for example in the infrared range, may be required.

The routing of the belt shown in detail in FIG. 4 for deflecting the transporting belt (15) in the region of the saw blades (6) shows a part of the deflecting unit (12) that extends in the vertical direction, opposite which a saw blade (6) is represented in section.

The upper deflecting rollers (16) and the lower deflecting roller (17) are fixed components of the deflecting unit (12). Instead of the one, lower deflecting roller (17), two deflecting rollers (17) may also be fitted.

The drive roller (19), which is also represented in FIG. 1 and FIG. 3, drives the entire transporting belt (15). The hold-down rollers (5), the upper deflecting rollers (16) and the lower deflecting roller (17), as well as the right-hand roller, not designated any more specifically, provide the depicted running of the transporting belt (15). The covering (24) reduces the saw gap to the extent necessary.

Instead of the saw blades (6), other means for separating the respective material may also be provided in the device according to the invention, such as for example laser and/or high-pressure water jet devices. The parts of the system that represent the supports for the separating means must in this case be correspondingly converted. In special cases, the use of laser and/or high-pressure water jet devices in conjunction with the saw blades (6) is also conceivable. The replacement of just one saw blade (6) by a laser and/or high-pressure water jet device may similarly also solve specific separating problems, in which case the other saw blade (6) is no longer needed.

For the case where the material occurring is separated by means of a laser device or by means of a high-pressure water jet device, the covering (24) is provided with an appropriate formation, on the one hand protecting the roller (17) but on the other hand reliably ensuring the separation.

In the case of all the drives, servomotors are used instead of, for example, hydraulic drives.

The device according to the invention may be automatically operated, in particular because of the servomotors that have to be precisely controlled and the numerous sensors providing information about the operating sequence. A corresponding control program should be created by a person skilled in the art.

The device according to the invention may be provided with a soundproofing device. In the simplest case, this comprises a soundproofing enclosure. A more sophisticated method of achieving this purpose is that of sound reduction by phase reversal and generation of sound counter to the frequency components that produce the most disturbance.

When the system is charged with mineral wool sheets, a cycle time of 43 cuts per minute has been achieved.

Since the operation of separating material proceeds automatically and, on the other hand, it must also be taken into consideration that the service life of the saw blades (6) is limited and is most clearly noticeable by a lower cutting performance, in the case of the device according to the invention the cutting performance is detected. This may take place most simply by measuring the time interval that is required for one or more cutting operations and comparing it with the corresponding time interval after the installation of a new saw blade.

Moreover, it is evident that the measuring of the advancing rate of the material to be separated must be detected for controlling the automatic separating operation.

LIST OF DESIGNATIONS (1) carriage support
(2) drive unit for a saw blade (3) synchronous drive for the main carriage
(4) carriage
(5) hold-down rollers
(6) saw blade
(7) pendulum housing
(8) power transmission element for the saw blade drive
(9) basic frame
(10) material
(11) bearing and mounting for a saw blade
(12) deflecting unit
(13) drive for transporting belt
(14) drive unit for pendulum
(15) transporting belt
(16) upper deflecting roller
(17) lower deflecting roller
(18) suction extraction device for sawdust
(19) drive roller
(20) running rail of the guiding carriage for the deflecting unit
(21) running rail for the main carriage
(22) sensor system
(23) camera system
(24) covering of saw gap

The invention claimed is:

1. A device for separating insulating materials comprising mineral wool, supplied in a continuous production process, into determinable lengths, comprising the following features:
   a) the separating of the material is performed by way of two circular saw blades, which are suspended in a pendular manner between lateral edges of the transporting belt via respective pendulum units from a carriage above a transporting belt and movable in a non-circular path and, wherein the circular saw blades are driven separately, and the two circular saw blades are coplanar,
   b) the position of the pendulum units and saw blades can be adjusted by way of the carriage in a direction in which material is supplied,
   c) each of a drive of the carriage, a drive of the saw blades, a drive of the pendulum units and a drive of the transporting belt is performed by way of servomotors,
   d) a lowering of the transporting belt in a running plane of the saw blades is performed by a deflecting unit, wherein the deflecting unit is connected to the carriage and moves synchronously with the saw blades, and
   e) a material separating operation is controlled automatically in accordance with a cutting performance of the separating device and an advancing rate of material inflow.

2. A device for separating insulating materials comprising mineral wool, supplied in a continuous production process, into determinable lengths, comprising the following features:
   a) the separating of the material is performed by way of two circular saw blades, which are suspended in a pendular manner between lateral edges of the transporting belt via respective pendulum units from a carriage above a transporting belt and movable in a non-circular path, and wherein the circular saw blades are driven separately, and the two circular saw blades are coplanar,
   b) the position of the pendulum units and saw blades can be adjusted by way of the carriage in a direction in which material is supplied,
   c) each of a drive of the carriage, a drive of the saw blades, a drive of the pendulum units and a drive of the transporting belt is performed by way of servomotors,
   d) a lowering of the transporting belt in a running plane of the saw blades is performed by a deflecting unit, wherein the deflecting unit is connected to the carriage and moves synchronously with the saw blades,
   e) a material separating operation is controlled automatically in accordance with a cutting performance of the separating device and an advancing rate of material inflow, and
   f) the saw blades move on a path describing a double cycloid curve.

3. The device as claimed in claim 1, wherein the saw blades run in opposite directions.

4. The device as claimed in claim 1, wherein the deflecting unit diverts the transporting belt in the form of a V-shaped or U-shaped diversion.

5. The device as claimed in claim 1, wherein the deflecting unit comprises two upper deflecting rollers and at least one lower deflecting roller, wherein the at least one lower deflecting roller is positioned between the two upper deflecting rollers.

6. The device as claimed in claim 1, wherein the deflecting unit comprises two upper deflecting rollers and two lower deflecting rollers, wherein the two lower deflecting rollers are positioned between the two upper deflecting rollers.

* * * * *